United States Patent [19]
Yamamoto et al.

[11] Patent Number: 5,978,611
[45] Date of Patent: *Nov. 2, 1999

[54] ELECTRO-DEVELOPING TYPE CAMERA

[75] Inventors: Yasuhiro Yamamoto; Koichi Sato; Tahei Morisawa; Makoto Mogamiya; Tetsuya Abe; Naoki Koshikawa, all of Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/658,628

[22] Filed: Jun. 5, 1996

[30] Foreign Application Priority Data

| Jun. 6, 1995 | [JP] | Japan | 7-162922 |
| Jun. 6, 1995 | [JP] | Japan | 7-162923 |
| Jun. 26, 1995 | [JP] | Japan | 7-182094 |

[51] Int. Cl.⁶ .................................................. G03B 19/00
[52] U.S. Cl. .......................................... 396/429; 348/267
[58] Field of Search ..................................... 348/230, 264, 348/266, 267; 396/30, 429; 358/506

[56] References Cited

U.S. PATENT DOCUMENTS

| 4,755,880 | 7/1988 | Haenel et al. | 358/213.11 |
| 4,945,423 | 7/1990 | Takanashi et al. | 358/300 |
| 4,956,713 | 9/1990 | Takanashi et al. | 358/209 |
| 5,070,409 | 12/1991 | Miyadera et al. . | |
| 5,161,233 | 11/1992 | Matsuo et al. | 355/218 |
| 5,231,501 | 7/1993 | Sakai . | |
| 5,268,763 | 12/1993 | Takanashi et al. | 358/209 |
| 5,294,990 | 3/1994 | Aoki . | |
| 5,424,156 | 6/1995 | Aoki et al. . | |
| 5,488,601 | 1/1996 | Sakano et al. | 369/120 |
| 5,589,952 | 12/1996 | Sato et al. | 358/487 |
| 5,638,103 | 6/1997 | Obata et al. | 347/164 |
| 5,739,849 | 4/1998 | Aoki et al. . | |
| 5,778,270 | 7/1998 | Morisawa . | |
| 5,842,049 | 11/1998 | Aoki . | |
| 5,842,050 | 11/1998 | Aoki . | |
| 5,862,425 | 1/1999 | Aoki . | |

FOREIGN PATENT DOCUMENTS 5-2280   1/1993   Japan .

*Primary Examiner*—Safet Metjahic
*Assistant Examiner*—John Chizmar
*Attorney, Agent, or Firm*—Greenblum & Bernstein P.L.C.

[57] ABSTRACT

An electro-developing type camera using an electro-developing recording medium on which an image is developed while an electric voltage is applied thereto. The image is read out from the electro-developing medium by a scanning mechanism. A color separation filter is disposed in front of the recording medium, so that R, G and B images are recorded on first, second and third recording areas, respectively. The color separation filter and the recording medium are disks rotatably provided. A photographing optical system is disposed at a first position at which the optical axis thereof is positioned above the rotational axes. The scanning mechanism is disposed at a second position at which the scanning mechanism is positioned under the rotational axes of the electro-developing recording medium and the color separation filter. Each of the recording areas is positioned above the rotational axes when a photographing operation of the recording area is carried out, and is positioned under the rotational axes when a reading operation of the image from the recording medium is carried out.

15 Claims, 11 Drawing Sheets

ELECTRO-DEVELOPING TYPE CAMERA

BACKGROUND OF THE INVENTION

1. Field of the Invention

The present invention relates to a camera using a so-called electro-developing recording medium, in which an image obtained by exposing the recording medium is electronically developed.

2. Description of the Related Art

Conventionally, there is known a photographic material which electronically develops an optical image formed thereon through a photographing lens. U.S. Pat. No. 5,424,156 (corresponding to Japanese Unexamined Patent Publication No. 5-2280), for example, discloses a recording medium which is a combination of an electrostatic information recording medium and an electric charge keeping medium. In this specification, such a recording medium is referred to as an electro-developing recording medium, and a camera using the electro-developing recording medium is referred to as an electro-developing type camera.

In the electro-developing recording medium disclosed in the above publication, the electrostatic information recording medium has a photoconducting layer and an inorganic oxide material layer, and the electric charge keeping medium has a liquid crystal display. In this structure, when the electrostatic information recording medium is exposed while an electric voltage is applied to the electrostatic information recording medium and the electric charge keeping medium, electric charge in accordance with the amount of incident light is generated in the electrostatic information recording medium. Since the intensity of the electric field applied to the liquid crystal display facing the electrostatic information recording medium is varied in accordance with the generated electric charge, an image corresponding to the amount of light distribution is indicated or developed on the liquid crystal display.

The image developed on the liquid crystal display can be sensed by using an optical element such as a line sensor. Namely, a front surface of the electro-developing recording medium is illuminated by light, and the light passing through the recording medium is sensed by the line sensor which scans along the rear surface of the recording medium, so that the image can be read out from the line sensor.

If the electro-developing type camera is constructed in such a manner that, in addition to the photographing operation, the image can be read out from the electro-developing recording medium, then a member such as an illumination light source needs to be disposed between the photographing optical system and the electro-developing recording medium. This structure causes difficulty in reducing the axial size of the photographing optical system, so that a design restriction occurs.

SUMMARY OF THE INVENTION

Therefore, an object of the present invention is to provide an electro-developing type camera in which a developing operation and a reading operation can be performed, and the axial size of the photographing optical system can be reduced.

According to the present invention, there is provided an electro-developing type camera comprising an electro-developing recording medium, scanning means, and moving means.

The electro-developing recording medium has a recording area which electronically develops an image formed thereon, and can move along a surface thereof. The scanning means scans the electro-developing recording medium so that the image formed on the electro-developing recording medium is read out. The moving means moves the electro-developing recording medium in such a manner that, when the image is developed, the electro-developing recording medium is positioned at a first position, and when the image developed on the electro-developing recording medium is read out by the scanning means, the electro-developing recording medium is positioned at a second position which is different from the first position.

Further, according to the present invention, there is provided an electro-developing type camera comprising an electro-developing recording medium, scanning means, a color filter and control means.

The electro-developing recording medium electronically develops an image formed thereon. The scanning means scans the electro-developing recording medium so that the image is read out. The color filter has color filter elements and a reading area having spectral characteristics different from the color filter elements. The color filter faces the electro-developing recording medium. The control means controls a position of the color filter. The control means positions the reading area to face the electro-developing recording medium when the scanning means scans the electro-developing recording medium.

Furthermore, according to the present invention, there is provided an electro-developing type camera comprising an electro-developing recording medium, scanning means, a color filter, a light source and control means.

The electro-developing recording medium electronically develops an image formed thereon. The scanning means scans the electro-developing recording medium so that the image is read out. The color filter has three primary color filter elements. The color filter faces the electro-developing recording medium. The light source emits light having a predetermined wavelength distribution onto the electro-developing recording medium through the color filter so that the scanning means scans the electro-developing recording medium. The control means controls a position of the color filter. The control means controls the reading area to face a predetermined color filter element included in the primary color filter elements, when the scanning means scans the electro-developing recording medium. The predetermined color filter element has a spectral characteristic such that substantially all light emitted from the light source passes therethrough.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
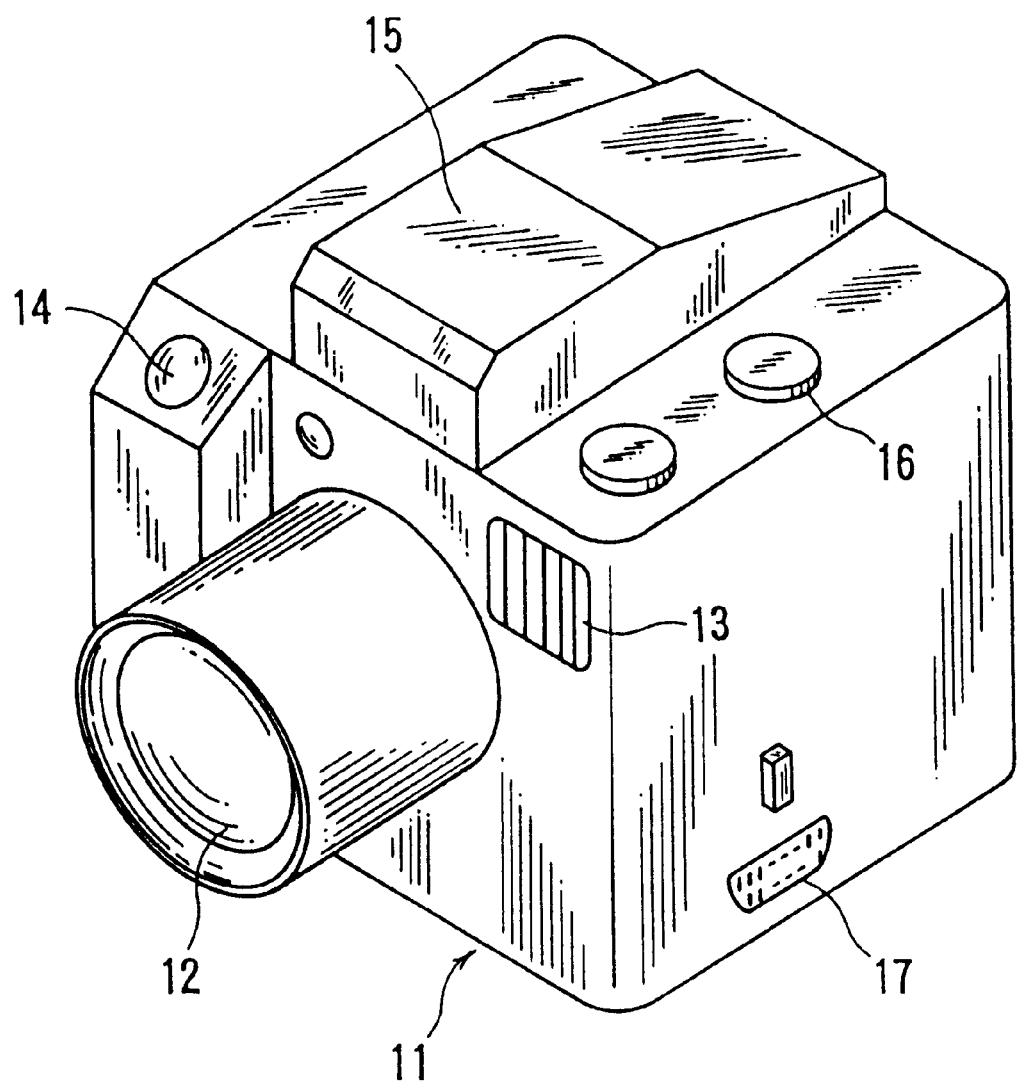
FIG. 1 is an external view showing a still video camera to which first through third embodiments according to the present invention are applied.

FIG. 1 is an external view of a still video camera to which a first embodiment of the present invention is applied. This still video camera is an electro-developing type camera, which is constructed in such a manner that an image is developed by an electro-developing recording medium.

When viewing the camera body 11 from a front side, on the front surface of the camera body 11, a photographing optical system 12 including a photographing lens and so on is provided on approximately the central portion of the front surface, and an electronic flash 13 is disposed on a portion to the right of and above the photographing optical system 12. A release switch 14 is provided on the side of the optical system 12 opposite to the electronic flash 13. On the upper surface of the camera body 11, a view finder 15 is provided at the center portion thereof, and operation switches including a scan start switch 16 are provided on a side of the view finder 15. On a side surface of the camera body 11, an output terminal 17 is formed on a lower portion thereof so that an image signal obtained by this camera can be outputted to an external recording device.

Figure 2:
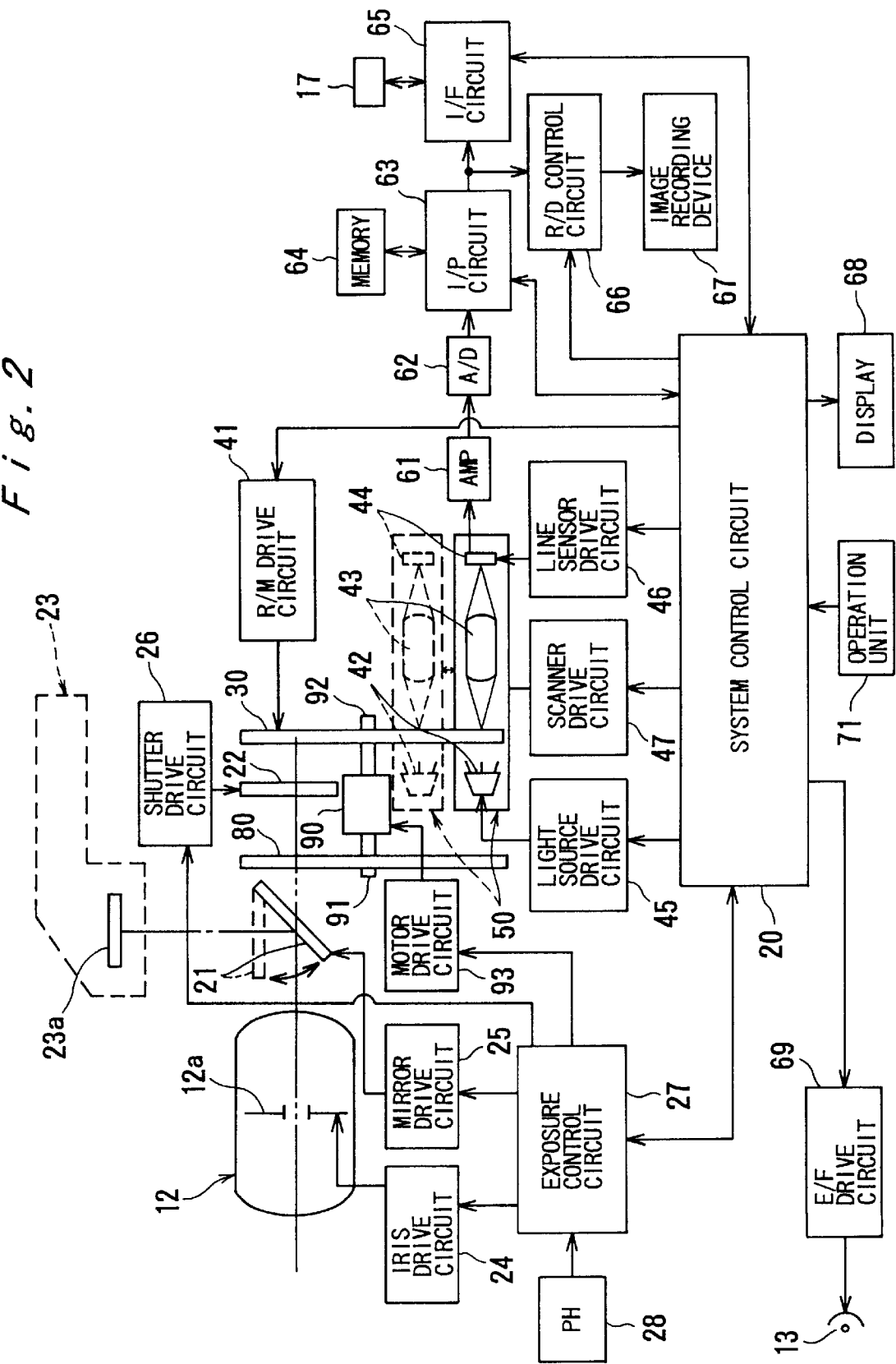
FIG. 2 is a block diagram of the still video camera of the first embodiment.

FIG. 2 is a block diagram of the still video camera. A system control circuit 20 including a micro-computer is mounted to control the still video camera as a whole.

The photographing optical system 12 has a plurality of lens groups and an aperture 12a. A color separation filter 80 and an electro-developing recording medium 30 are disposed behind the photographing optical system 12, and the color separation filter 80 is positioned closer to the photographing optical system 12 in comparison with the electro-developing recording medium 30. A quick return mirror 21 is placed between the photographing optical system 12 and the color separation filter 80. A focusing glass 23a, included in a view-finder optical system 23, is disposed above the quick return mirror 21. A shutter 22 is provided between the color separation filter 80 and the electro-developing recording medium 30.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24, under control of the exposure control circuit 27, based on an output signal of the photometry sensor 28.

The quick return mirror 21 is usually set to a down position (an inclining position shown by the solid lines in the drawing), so that a light beam passing through the photographing optical system 12 is led to the view-finder optical system 23. Thus, an object to be photographed can be observed by the photographer. When a photographing operation is carried out, the quick return mirror 21 is rotated upward by the mirror drive circuit 25 and set to an up position (a horizontal position shown by the broken lines in the drawing), so that the light beam is led to the electro-developing recording medium 30.

The shutter 22 is usually closed, and upon a photographing operation, the shutter 22 is opened for a predetermined period by the shutter drive circuit 26 under control of the exposure control circuit 27. Thus, the light beam passing through the photographing optical system 12 enters a light receiving surface of the electro-developing recording medium 30.

The color separation filter 80 and the electro-developing recording medium 30 are disks and are coaxially disposed. A stepping motor 90 has shafts 91 and 92, which are extended in opposite directions to each other and are connected to central portions of the color separation filter 80 and the electro-developing recording medium 30, respectively. Namely, the color separation filter 80 and the electro-developing recording medium 30 are rotatable about the center axes thereof, and are rotated in synchronization with each other. The stepping motor 90 is driven by a motor drive circuit 93 based on an output signal of the exposure control circuit 27, and is rotated approximately 120 degrees at every operation in which the shutter 22 is opened and closed.

An electric voltage is applied to the electro-developing recording medium 30 under control of a recording medium drive circuit 41. By exposing the electro-developing recording medium 30 while applying the voltage, an image formed by the photographing optical system 12 is electronically developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. The shutter 22 is disposed at a first position above the stepping motor 90 while the scanning mechanism 50 is positioned at a second position lower than the stepping motor 90. Namely, the scanning mechanism 50 and the shutter 22 are positioned opposite to each other with respect to the center axes of the color separation filter 80 and the electro-developing recording medium 30. In other words, the first and second positions are symmetrical about the center axis, and the first position corresponds to the optical axis of the photographing optical system 12 while the second position is offset from the optical axis.

A light source 42, including an LED (light emitting diode), for example, a scanner optical system 43 and a line sensor 44 are supported by the scanning mechanism 50, and are moved along the electro-developing recording medium 30 by a scanning operation of the scanning mechanism 50.

The light source 42 outputs light having a spectral distribution which is suitable for a reading operation in which an image formed on the electro-developing recording medium 30 is read out therefrom.

The line sensor 44 may be a one dimensional CCD sensor of 2000 pixels, for example. The light source 42 can be moved along the front surface of the electro-developing recording medium 30, and the line sensor 44 can be moved along the rear surface of the electro-developing recording medium 30. The scanner optical system 43 is disposed between the light source 42 and the line sensor 44. When a scanning is carried out by the scanning mechanism 50, the light source 42 is positioned in front of the electro-developing recording medium 30 and opposite to the line sensor 44 relative to the electro-developing recording medium 30, so that the image developed by the electro-developing recording medium 30 is illuminated by the light source 42 and formed on the light receiving surface of the line sensor 44, due to an operation of the scanner optical system 43. Namely, the scanner optical system 43 is disposed on the optical path of the light beam which passes through the electro-developing recording medium 30, and the line sensor 44 is moved in an imaging plane, on which an image is formed, by the scanner optical system 43.

ON-OFF control of the light source 42 is performed by a light source drive circuit 45. Control of the reading operation of the pixel signal generated in the line sensor 44 is carried out by a line sensor drive circuit 46. Control of the movement of the scanning mechanism 50 is performed by a scanner drive circuit 47. The circuits 45, 46 and 47 are controlled by the system control circuit 20.

A pixel signal read out from the line sensor 44 is amplified by an amplifier 61, and converted to a digital signal by an A/D converter 62.

The digital pixel signal is subjected to a shading correction, a gamma correction, and so on, by an image processing circuit 63 under control of the system control circuit 20, and then, is temporarily stored in a memory 64. The memory includes an EEPROM in which correction data for the shading correction is stored. Note that the memory 64 may have a storage capacity equal to one horizontal scanning line outputted from the line sensor 44, or it may have a storage capacity of one frame's worth of image signals.

The pixel signal outputted from the memory 64 is inputted into an interface circuit 65, through the image processing circuit 63, so that the pixel signal is subjected to a predetermined process such as a format conversion, and can be outputted to an external display device (not shown) through the output terminal 17. The pixel signal outputted from the image processing circuit 63 is subjected to a predetermined process, such as an image compression and a format conversion, in a recording device control circuit 66, so that the pixel signal can be recorded on a recording medium such as an IC memory card, for example, in an image recording device 67. The interface circuit 65 and the recording device control circuit 66 are operated in accordance with a command signal outputted from the system control circuit 20.

An operation unit 71, including the release switch 14 and the scan start switch 16, is connected to the system control circuit 20. A photographing operation is performed by the operation of the release switch 14. A reading operation by which an image signal is read from the electro-developing recording medium 30 is performed in accordance with the operation of the scan start switch 16.

Further, a display device 68 and an electronic flash drive circuit 69 are connected to the system control circuit 20. The display device is provided for indicating various setting conditions of the still video camera. The electronic flash drive circuit 69 is provided for controlling the electronic flash 13 so that the electronic flash 13 radiates a flash of light.

Figure 3:
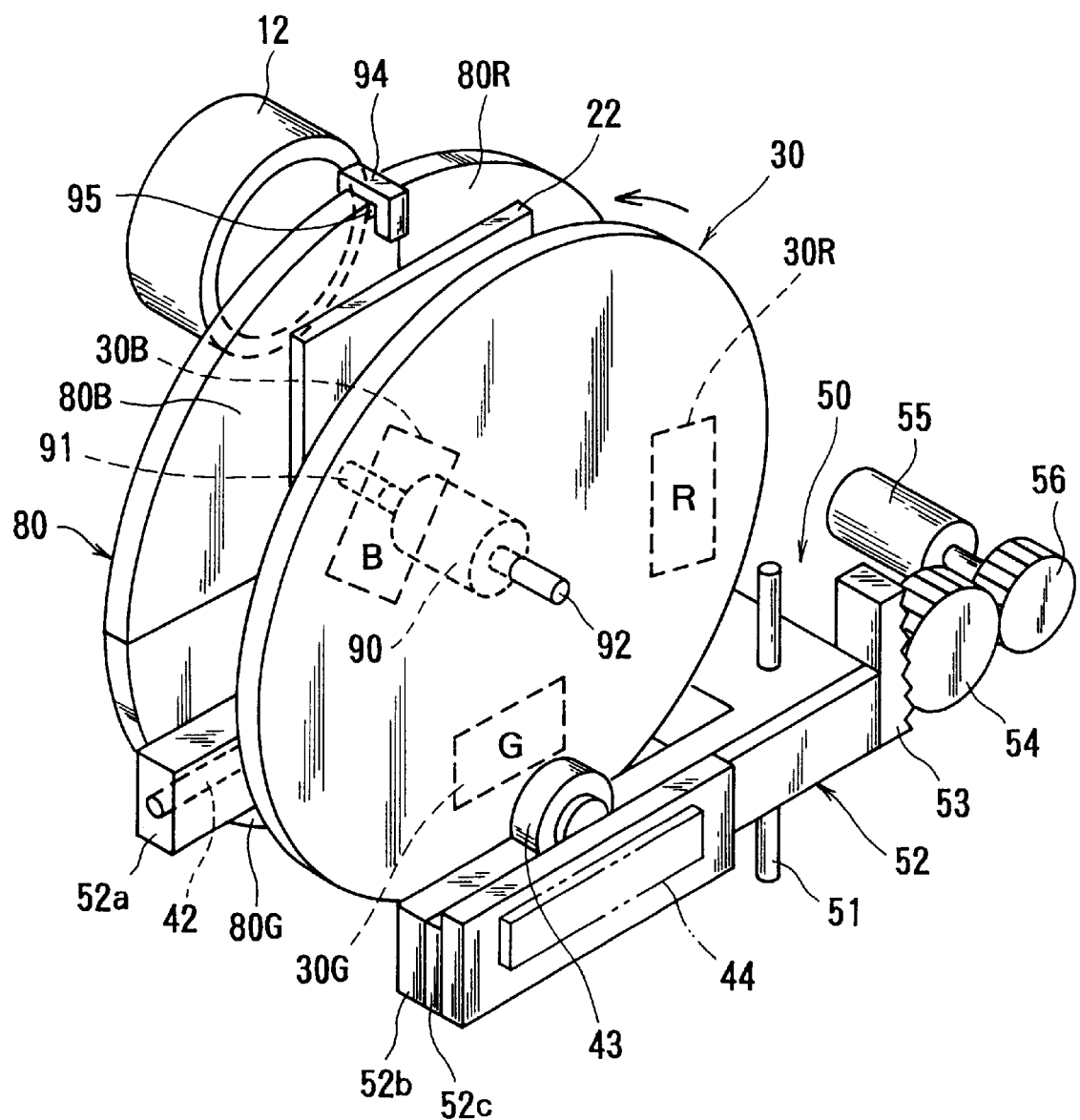
FIG. 3 is a perspective view showing a scanning mechanism and members provided close thereto in the first embodiment.

FIG. 3 shows the scanning mechanism 50 and a construction provided close thereto.

A moving member 52 of the scanning mechanism 50 is slidably supported by a guide shaft 51, and has first and second leg portions 52a and 52b and a support portion 52c. The first leg portion 52a is extended between the color separation filter 80 and the electro-developing recording medium 30, and under the stepping motor 90. The second leg portion 52b is extended along a rear surface of the electro-developing recording medium 30. The support portion 52c is provided behind the second leg portion 52b.

The light source 42 is mounted on the first leg portion 52a, so that an illumination light beam radiated from the light source 42 is irradiated onto the electro-developing recording medium 30 through a collimator lens (not shown) attached to the first leg portion 52a. The scanner optical system 43 and the line sensor 44 are provided on the second leg portion 52b and the support portion 52c, respectively. Each of the light source 42 and the line sensor 44 is extended in a horizontal direction.

A rack 53 is provided on a side surface of the moving member 52. The rack 53 meshes with a pinion gear 54, which meshes with a gear fixed on an output shaft of a scan drive motor 55.

The electro-developing recording medium 30 has a first recording area 30R on which a red (R) image is formed, a second recording area 30G on which a green (G) image is formed, and a third recording area 30B on which a blue (B) image is formed. Each of these recording areas 30R, 30G and 30B is rectangular, faces the shutter 22 when positioned at the first position which is located above the output shaft 92, and faces the light source 42 and the scanner optical system 43 when positioned at the second position which is located under the output shaft 92.

The color separation filter 80 is divided into an R filter element 80R, a G filter element 80G and a blue filter element 80B by three straight lines radially extending from the axis of the color separation filter 80. Each of these filter elements 80R, 80G and 80B has a fan-shape the center angle of which is 120 degrees. A mask 95 for blocking light is formed on a portion which is located at an outermost portion of the color separation filter 80, and on the dividing line between the R filter element 80R and the B filter element 80B. An original point sensor 94, which is a photo-interrupter, is provided on a portion facing a peripheral portion of the color separation filter 80.

When a photographing operation is performed, the color separation filter 80 is positioned in such a manner that one of the filter elements 80R, 80G or 80B is positioned behind the photographing optical system 12, namely on the photographing optical axis, and the electro-developing recording medium 30 is positioned in such a manner that one of the recording areas 30R, 30G or 30B, corresponding to the filter element is positioned on the photographing optical axis. Each of the color separation filter 80 and the electro-developing recording medium 30 is rotated by one revolution, while one frame image is photographed. Namely, an R image is developed on the first recording area 30R, a G image is developed on the second recording area 30G and a B image is developed on the third recording area 30B.

After completing the photographing operation, if the scan start switch 16 is operated, the scan drive motor 55 is driven so that the moving member 52 is moved upward. Thus, a scanning operation of the line sensor 44 is performed, so that the line sensor 44 is moved in a direction perpendicular to the longitudinal direction thereof. The scanning operation is carried out for each of the recording areas 30R, 30G and 30B. Namely, the electro-developing recording medium 30 is rotated by one revolution for the scanning operation.

Figure 4:
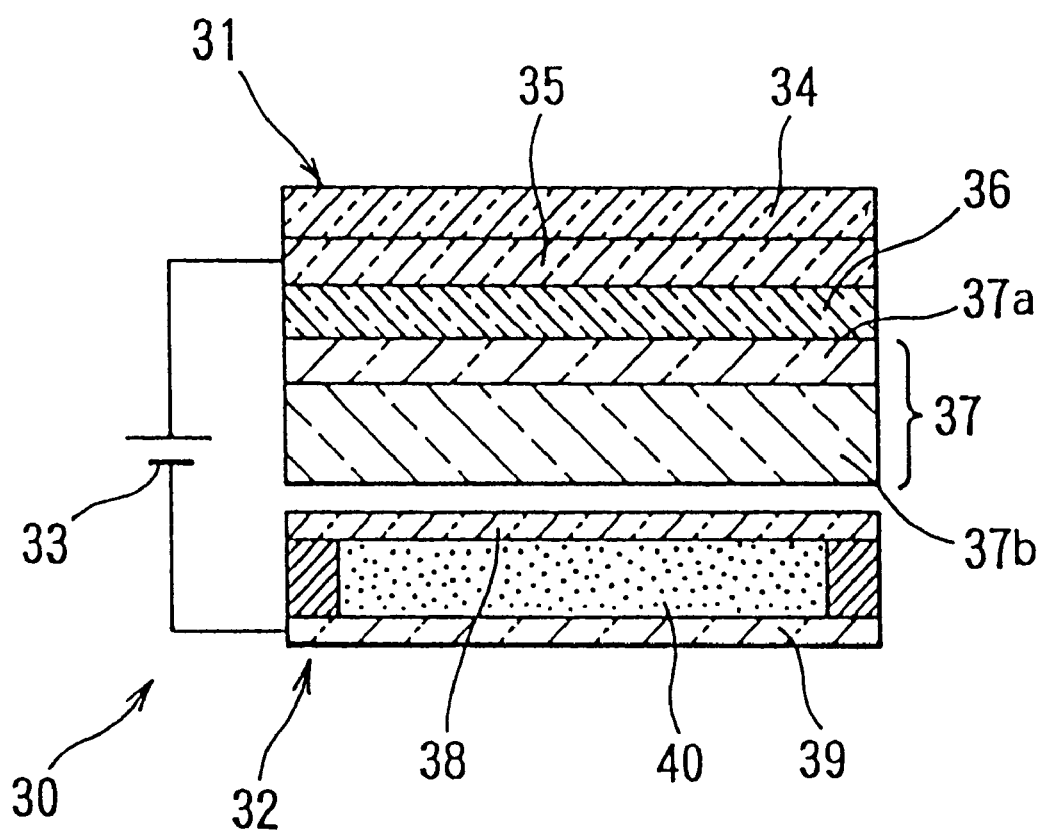
FIG. 4 is a sectional view showing a structure of an electro-developing recording medium.

FIG. 4 shows a structure of the electro-developing recording medium 30, and is the same as that shown in Japanese Unexamined Patent Publication No. 5-2280.

The electro-developing recording medium 30 includes an electrostatic information recording medium 31 and an electric charge keeping medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

An ON-OFF condition of the electric power source 33 is controlled by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31, in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge keeping medium 32 is a liquid crystal display having a memory-type liquid crystal such as a smectic liquid crystal. Thus, the developed visible image is kept in the liquid crystal display even if the electric field is removed. In the liquid crystal, the developed visible image can be deleted by heating the liquid crystal, using a heating device (not shown) at a predetermined temperature. Consequently, the same electric charge keeping medium 32 can be used repeatedly.

Figure 5:
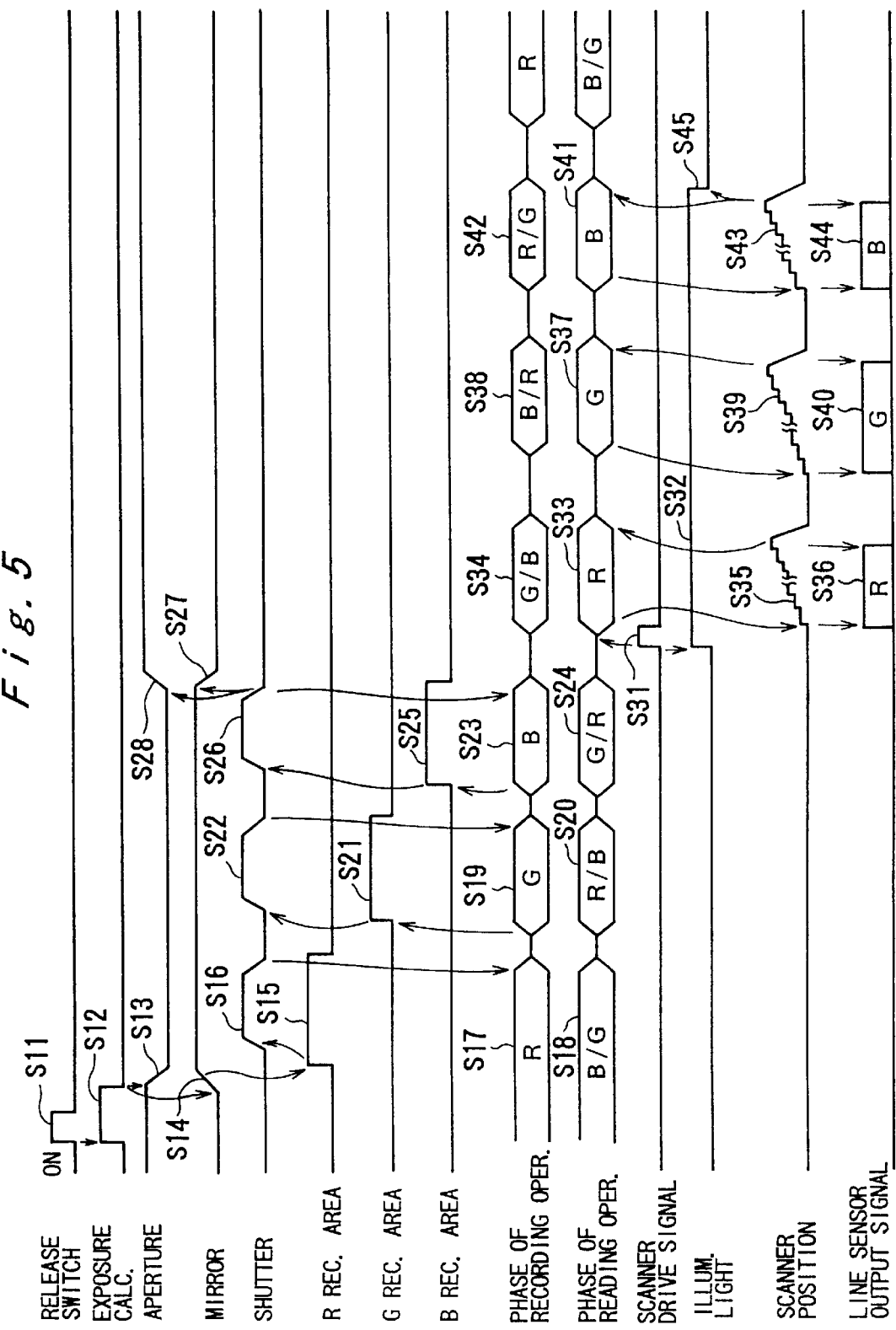
FIG. 5 is a timing chart showing a photographing operation of an image signal of the first embodiment.

FIG. 5 shows a timing chart of a photographing operation of an image signal onto the electro-developing recording medium 30 and a reading operation of an image signal from the electro-developing recording medium through the line sensor 44. With reference to the drawing, an operation of the first embodiment will be described.

When it is sensed that the release switch 14 has been turned ON (reference S11), an output signal of the photometry sensor 28, i.e., a photometry value, is sensed, and a photometry calculation is performed based on the photometry value (reference S12). Based on the result of the photometry calculation, the opening degree of the aperture 12a is changed from the fully open state to a predetermined opening degree (reference S13). Then, the quick return mirror 21 is changed from the down condition to the up-condition (reference S14).

When it is confirmed that the quick return mirror 21 has been changed to the up-condition and the opening degree adjustment of the aperture 12a has been completed, a recording medium activating signal corresponding to the first recording area 30R is set to an ON-state (reference S15) so that a voltage is applied to the first recording area 30R. At the same time, the shutter 22 is opened for an exposure period (reference S16) which is obtained by the photometry calculation (reference S12).

Note that, prior to the opening operation of the shutter 22, the color separation filter 80 has been positioned in such a manner that the R filter element 80R faces the shutter 22 (reference S17) and the G filter element 80G and the B filter element 80B are positioned close to the scanning mechanism 50 (reference S18). Regarding the electro-developing recording medium 30, the first recording area 30R faces the shutter 22, and the second and third recording areas 30G and 30B are positioned close to the scanning mechanism 50. Therefore, the R image is formed or developed on the first recording area 30R.

When the shutter 22 is closed, the color separation filter 80 and the electro-developing recording medium 30 are rotated by approximately 120 degrees, so that the G filter element 80G and the second recording area 30G are set to the first position to face the shutter 22 (reference S19). The R filter element 80R, the B filter element 80B, and the first and third recording areas 30R and 30B are set to the second position which is close to the scanning mechanism 50 (reference S20). Under this condition, the recording medium activating signal of the second recording area 30G is set to the ON condition (reference S21), so that an electric voltage is applied to the second recording area 30G, and the shutter 22 is opened for the exposure period (reference S22) which is obtained by the photometry calculation. Therefore, the G image is formed or developed on the second recording area 30G.

When the shutter 22 is closed, the color separation filter 80 and the electro-developing recording medium 30 are again rotated by approximately 120 degrees, so that the B filter element 80B and the third recording area 30B face the shutter 22 (reference S23). The G filter element 80G, the R filter element 80R, and the second and first recording areas 30G and 30R are positioned close to the scanning mechanism 50 (reference S24). Under this condition, the recording medium activating signal of the third recording area 30B is set to the ON condition (reference S25), and the shutter 22 is opened for the exposure period (reference S26) which is obtained by the photometry calculation. Thus, the B image is formed or developed on the third recording area 30B.

When the R, G and B images have been developed by the recording areas 30R, 30G and 30B, the quick return mirror 21 is changed to the down-condition (reference S27) and the aperture 12a is driven to the fully open condition (reference S28).

When the scan start switch 16 is depressed and a scanner drive command signal is outputted (reference S31), the light source 42 is lit (reference S32). The first recording area 30R is set to the second position where the first recording area 30R is close to the scanning mechanism 50 (reference S33), and the second and third recording areas 30G and 30B face the shutter 22 (reference S34). Note that, at this time, the R filter 80R is positioned close to the scanning mechanism 50, and the G and B filter elements 80G and 80B are positioned close to the shutter 22. Under this condition, the scanning mechanism 50 is driven, so that a scanning operation of the line sensor 44 is carried out (reference S35), and thus, the R image signal is outputted or read out through the line sensor (reference S36).

When the output operation of the R image signal is completed, the electro-developing recording medium 30 and the color separation filter 80 are rotated by approximately 120 degrees, and thus, the second recording area 30G is positioned close to the scanning mechanism 50 (reference S37) and the first and third recording areas 30R and 30B face the shutter 22 (reference S38). Under this condition, the scanning mechanism 50 is driven so that the scanning operation of the line sensor 44 is carried out (reference S39), and thus, the G image signal is outputted through the line sensor 44 (reference S40).

When the output operation of the G image signal is completed, the electro-developing recording medium 30 and the color separation filter 80 are rotated by approximately 120 degrees, and thus, the third recording area 30B is positioned close to the scanning mechanism 50 (reference S41) and the first and second recording areas 30R and 30G face the shutter 22 (reference S42). Under this condition, the scanning mechanism 50 is driven so that the scanning operation of the line sensor 44 is carried out (reference S43), and thus, the B image signal is outputted through the line sensor 44 (reference S44).

Thus, when the R, G and B image signals have been read out from the electro-developing recording medium 30, the light source 42 is put out (reference S45).

As described above, in the first embodiment, the scanning mechanism 50, by which the images recorded on the recording areas 30R, 30G and 30B of the electro-developing recording medium 30 are read out, is disposed on the second position which is under the rotational axes of the electro-developing recording medium 30 and the color separation filter 80, and the optical axis of the photographing optical system 12 is provided on the first position which is above the rotational axes. Each of the recording areas 30R, 30G and 30B is set to the first position when the photographing operation is performed, and is set to the second position when the reading operation is performed.

Therefore, the scanning mechanism 50 is disposed at a position offset from the optical axis of the photographing optical system 12, and the size of the camera along the optical axis is reduced, so that the degree of freedom in designing the camera is improved.

Figure 6:
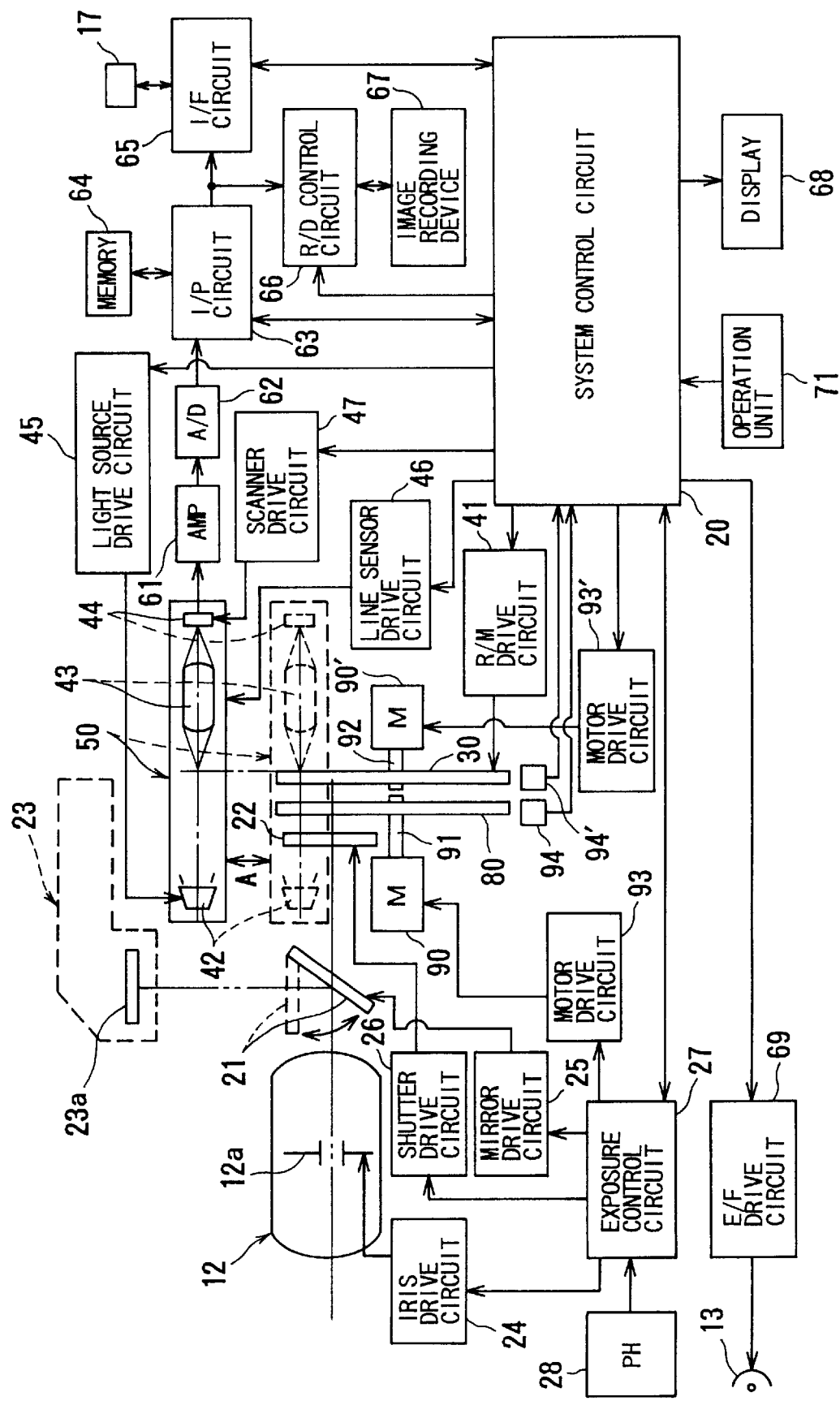
FIG. 6 is a block diagram of the still video camera of the second and third embodiments.

FIG. 6 is a block diagram of the still video camera (i.e., the electro-developing type camera) to which the second embodiment is applied. Note that an external view of the still video camera is the same as that of the first embodiment, and the construction of the electro-developing recording medium 30 is the same as that of the first embodiment.

In FIG. 6, a color separation filter 80 and an electro-developing recording medium 30 are disks, are coaxially disposed, and face each other. An output shaft 91 of a first stepping motor 90 is connected to a center axis of the color separation filter 80, and an output shaft 92 of a second stepping motor 90' is connected to a center axis of the electro-developing recording medium 30. The first and second stepping motors 90 and 90' are disposed on opposite positions about the color separation filter 80 and the electro-developing recording medium 30. The first stepping motor 90 is driven by a first motor drive circuit 93 based on an output signal of the exposure control circuit 27. The second stepping motor 90' is driven by a second motor drive circuit 93' based on an output signal of the exposure control circuit 27.

First and second original point sensors 94 and 94' are disposed close to peripheral portions of the color separation filter 80 and the electro-developing recording medium 30, respectively. These original point sensors 94 and 94' are photo-interrupters, so that the original positions of the color separation filter 80 and the electro-developing recording medium 30 are detected, and signals indicating the original points are inputted into the system control circuit 20.

A scanning mechanism 50 is provided close to the electro-developing recording medium 30. The scanning mechanism 50 is positioned above the first and second stepping motor 90 and 90', and is retreated upward to a position above the electro-developing recording medium 30, when an image signal is recorded on the electro-developing recording medium 30. The scanning mechanism 50 is positioned close to the electro-developing recording medium 30 and is moved along a straight line shown by an arrow A in FIG. 6, when the image signal recorded on the electro-developing recording medium 30 is read out therefrom.

The other components shown in FIG. 6 are the same as those of the first embodiment shown in FIG. 2.

Figure 7:
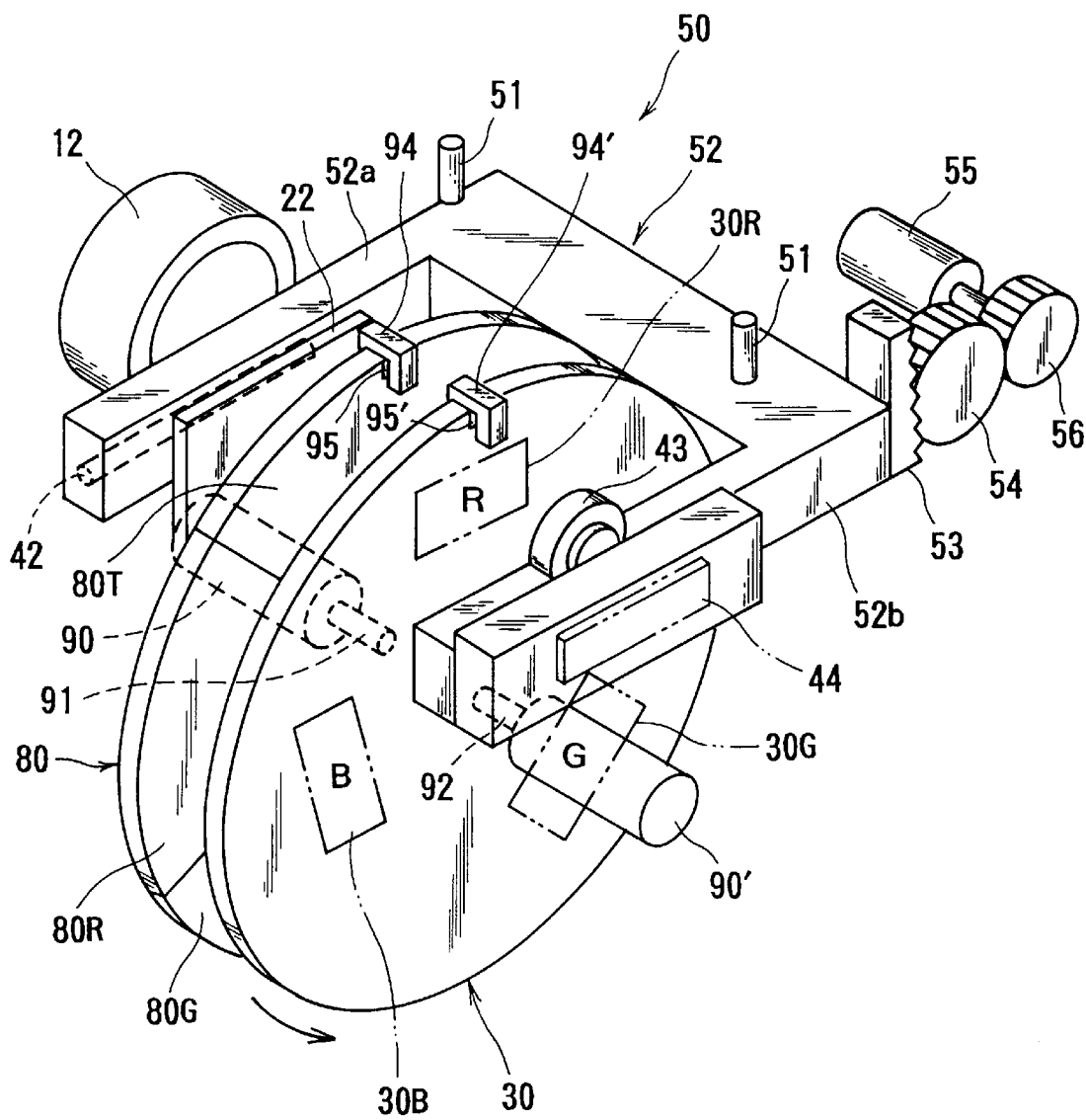
FIG. 7 is a perspective view showing a scanning mechanism and members provided close thereto in the second embodiment.

FIG. 7 shows the scanning mechanism 50 and members provided close thereto in the second embodiment.

A moving member 52 is slidably supported by a pair of guide shafts 51, and has first and second leg portions 52a and 52b. The first leg portion 52a is extended between the color separation filter 80 and the photographing optical system 12, and the second leg portion 52b is extended along a rear surface of the electro-developing recording medium 30.

The light source 42 is mounted on the first leg portion 52a, so that an illumination light beam radiated from the light source 42 is irradiated onto the electro-developing recording medium 30 through a collimator lens (not shown) attached to the first leg portion 52a. The scanner optical system 43 is provided in the second leg portion 52b and the line sensor 44 is fixed on a rear surface of the second leg portion 52b. Each of the light source 42 and the line sensor 44 is extended in a horizontal direction. A rack 53, provided on a side surface of the moving member 52, meshes with a pinion gear 54. Pinion gear 54 meshes with a gear fixed on an output shaft of a scan drive motor 55.

Figure 8:
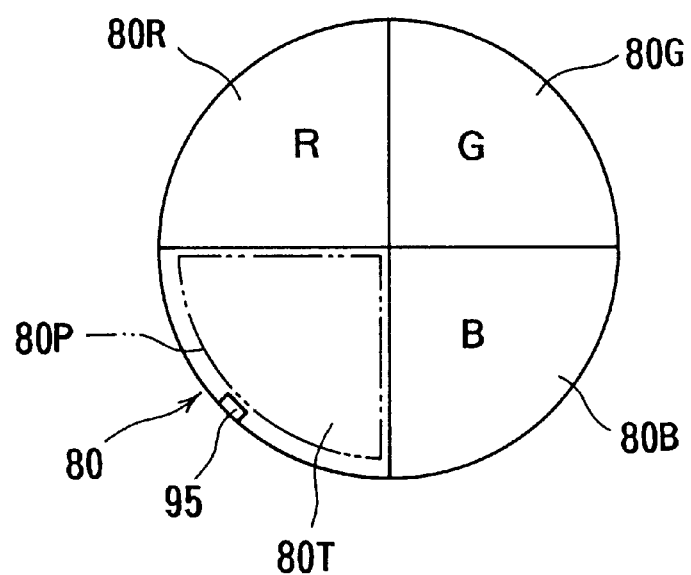
FIG. 8 is a view showing a color separation filter provided in the second embodiment.

As shown in FIG. 8, the color separation filter 80 is divided into an R filter element 80R, a G filter element 80G, a B filter element 80B and a transparent filter element (i.e., a reading area) 80T, by two straight lines which pass through the center axis of the filter 80 and intersect at a right angle. Namely, each of the filter elements 80R, 80G, 80B and 80T has a fan-shape the center angle of which is 90 degrees.

Figure 9:
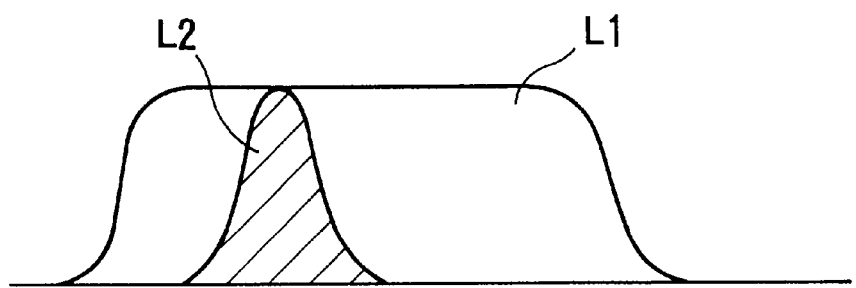
FIG. 9 is a diagram showing spectral characteristics of each of the filter elements of the second embodiment.

The transparent filter element 80T passes all light having any wavelength. Namely, as shown by reference L1 in FIG. 9, all wavelength components, included in the light radiated from the light source 42, pass the transparent filter element 80T, and thus, the spectral characteristics of the transparent filter element 80T are flat. Conversely, the filter elements 80R, 80G and 80B pass only light having a predetermined wavelength an example of which is shown by L2 in FIG. 9. Namely, the transparent filter element 80T has spectral characteristics different from those of the filter elements 80R, 80G and 80B.

A mask 95 for blocking light is formed on a portion which is located at an outermost portion of the transparent filter element 80T. An original point sensor 94, which is a photo-interrupter, is provided on a portion facing a peripheral portion of the transparent filter element 80T, to sense the mask 95.

In FIG. 7, the electro-developing recording medium 30 has a first recording area 30R on which a red (R) image is formed, a second recording area 30G on which a green (G) image is formed, and a third recording area 30B on which a blue (B) image is formed. Each of these recording areas 30R, 30G and 30B is rectangular, and is positioned between the photographing optical system 12 and the scanner optical system 43 when positioned at the uppermost position (see the recording area 30R in FIG. 7). Similar to the color separation filter 80, a mask 95' is formed on a portion which is located outside of the first recording area 30R. An original point sensor 94', which is a photo-interrupter, is provided on a portion facing a peripheral portion of the electro-developing recording medium 30, to sense the mask 95'.

When a photographing operation is performed, one of the filter elements 80R, 80G or 80B is positioned behind the photographing optical system 12, namely on the photographing optical axis, and the electro-developing recording medium 30 is positioned in such a manner that one of the recording areas 30R, 30G or 30B is positioned on the photographing optical axis. When the R image is recorded in the first recording area 30R, the R filter element 80R is positioned in front of the recording area 30R. When the G image is recorded in the second recording area 30G, the G filter element 80G is positioned in front of the recording area 30G. When the B image is recorded in the third recording area 30B, the B filter element 80B is positioned in front of the recording area 30B. Namely, while one frame image is recorded in the electro-developing recording medium 30, the color separation filter 80 is rotated by ¾ revolution and the electro-developing recording medium 30 is rotated by one revolution.

After completing the photographing operation, if the scan start switch 16 is operated, the scan drive motor 55 is rotated so that the moving member 52 is moved downward. Thus, a scanning operation of the line sensor 44 is performed, so that the line sensor 44 is moved in a direction perpendicular to the longitudinal direction thereof. The scanning operation is carried out for each of the recording areas 30R, 30G and 30B, and while the scanning operation is performed, the electro-developing recording medium 30 is rotated by one revolution, and the color separation filter 80 is stopped.

Figure 10:
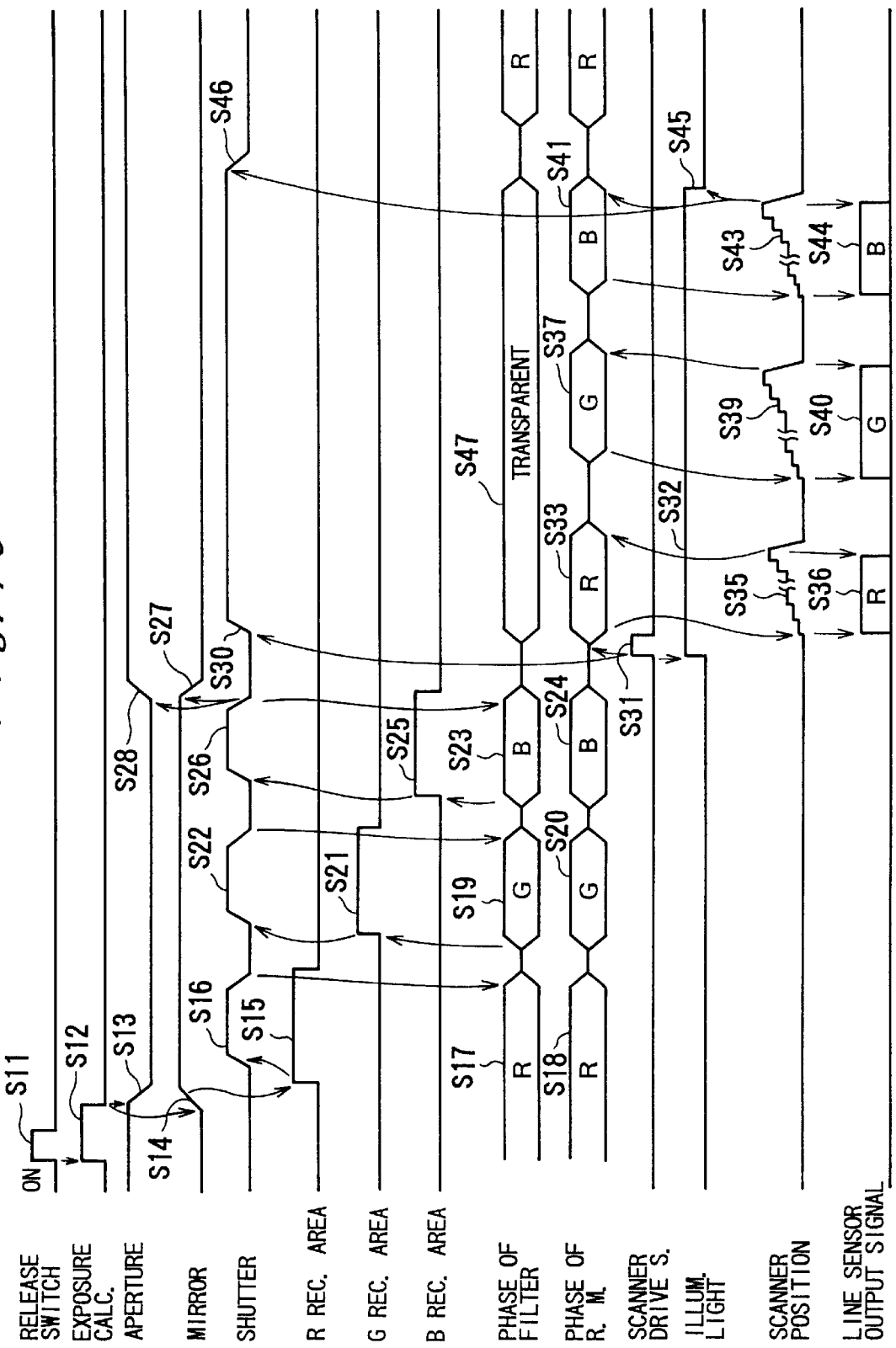
FIG. 10 is a timing chart showing a photographing operation of an image signal of the second embodiment.

FIG. 10 shows a timing chart of a photographing operation and a reading operation of the second embodiment.

The operations from the turning ON of the release switch 14 (reference S11) to the opening operation of the shutter 22 (reference S16) are the same as those of the first embodiment shown in FIG. 5.

Prior to the opening operation (reference S16) of the shutter 22, the color separation filter 80 has been positioned in such a manner that the R filter element 80R faces the shutter 22 (reference S17), and the recording medium 30 has been positioned in such a manner that the first recording area 30R faces the R filter element 80R (reference S18). Therefore, the R image is formed or developed on the first recording area 30R.

Note that the rotational positions of the electro-developing recording medium 30 and the color separation filter element 80 are obtained based on original point signals and rotational command signals. The original point signals are outputted from the original point sensors 94 and 94' when the sensors 94 and 94' sense the masks 95 and 95', respectively. The rotation command signals are outputted from the motor drive circuits 93 and 93' so that the stepping motors 90 and 90' are driven.

When the shutter 22 is closed, the color separation filter 80 is rotated by approximately 90 degrees, and the electro-developing recording medium 30 is rotated by approximately 120 degrees. As a result, the G filter element 80G faces the shutter 22 (reference S19), and the second recording area 30G faces the G filter element 80G (reference S20). Under this condition, the recording medium activating signal of the second recording area 30G is set to the ON condition (reference S21), so that an electric voltage is applied to the second recording area 30G, and the shutter 22 is opened for an exposure period (reference S22) which is obtained by the photometry calculation. Therefore, the G image is formed or developed on the second recording area 30G.

When the shutter 22 is closed, the color separation filter 80 is rotated by approximately 90 degrees, and the electro-developing recording medium 30 is rotated by approximately 120 degrees. As a result, the B filter element 80B faces the shutter 22 (reference S23), and the third recording area 30B faces the B filter element 80B (reference S24). Then, the recording medium activating signal of the third recording area 30B is set to the ON condition (reference S25), so that an electric voltage is applied to the third recording area 30B, and the shutter 22 is opened for the exposure period (reference S26) which is obtained by the photometry calculation. Therefore, the B image is formed or developed on the third recording area 30B.

Thus, when the R, G and B images have been developed by the recording areas 30R, 30G and 30B, the quick return mirror 21 is changed to the down-condition (reference S27) and the aperture 12a is driven to the fully open condition (reference S28).

When the scan start switch 16 is depressed and a scanner drive command signal is outputted (reference S31), the light source 42 is lit (reference S32) and the shutter 22 is fully opened (reference S30). The color separation filter 80 is set in such a manner that the transparent filter element 80T faces the shutter 22 (reference S47), and the electro-developing recording medium 30 is set in such a manner that the first recording area 30R faces the transparent filter element 80T (reference S33). The scanning mechanism 50 is then driven, so that a scanning operation of the line sensor 44 is carried out (reference, S35). Thus, the R image signal is outputted or read out through the line sensor (reference S36).

When the output operation of the R image signal is completed, the electro-developing recording medium 30 is rotated by approximately 120 degrees, so that the second recording area 30G faces the transparent filter element 80T (reference S37). The scanning mechanism 50 is then driven so that the scanning operation of the line sensor 44 is carried out (reference S39). Thus, the G image signal is outputted through the line sensor 44 (reference S40).

When the output operation of the G image signal is completed, the electro-developing recording medium 30 is rotated by approximately 120 degrees, so that the third recording area 30B faces the transparent filter element 80T (reference S41). Then, the scanning mechanism 50 is driven so that the scanning operation of the line sensor 44 is carried out (reference S43). Thus, the B image signal is outputted through the line sensor 44 (reference S44).

When the R, G and B image signals have been read out from the electro-developing recording medium 30, the light source 42 is put out (reference S45), and the shutter 22 is closed (reference S46).

As described above, in the second embodiment, the transparent filter element 80T is provided in the color separation filter 80 which is disposed in front of the electro-developing recording medium 30. When, an image developed by the electro-developing recording medium 30 is read from the electro-developing medium, the transparent filter element 80T is placed in front of the electro-developing recording medium 30. Therefore, when reading the image, it is not necessary to withdraw one of the color separation filter 80 or the electro-developing recording medium 30 so that the color separation filter 80 and the electro-developing recording medium 30 do not face each other. Namely, a device for retreating one of the color separation filter 80 or the electro-developing recording medium 30 is not necessary and therefore, the electro-developing type camera can be made with a less complicated structure and becomes less bulky.

Note that, instead of the transparent filter element 80T, an opening 80P having a fan-shape as shown by a chained line in FIG. 8 may be formed in the color separation filter 80. Further, the transparent filter element 80T can be replaced with another filter element which has spectral characteristics which are different from those of R, G and B light beams and are proper for the reading operation, when a light source having a broad spectrum distribution, such as a fluorescent light, is used.

If the spectral characteristics of the reading area 80T of the color separation filter 80 is flat, the reading area 80T may be disposed on the optical axis of the photographing optical system 12, so that a simple monochrome image can be obtained using any one of the recording areas 30R, 30G and 30B.

Figure 11:
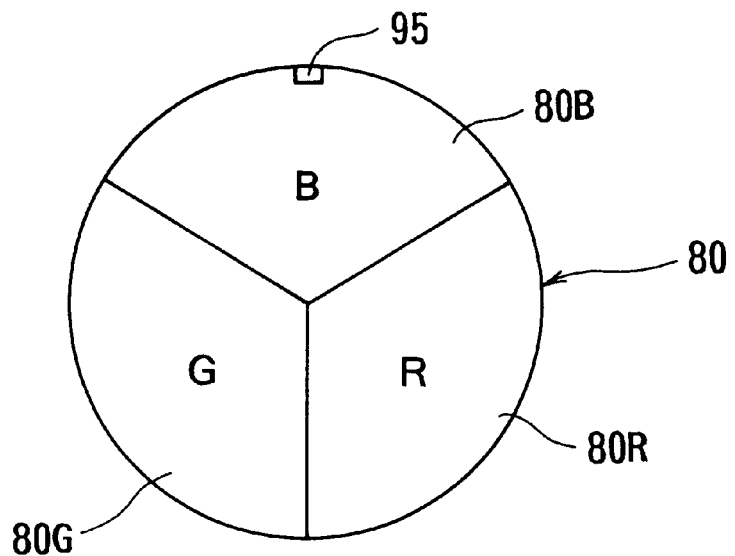
FIG. 11 is a view showing a color separation filter provided in the third embodiment.
Figure 12:
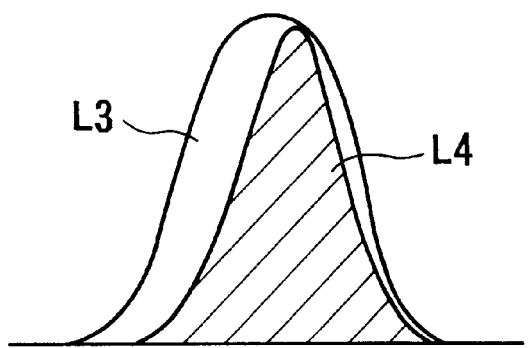
FIG. 12 is a diagram showing spectral characteristics of each of the filter elements of the third embodiment.

FIGS. 11 and 12 show a third embodiment of a color separation filter. FIG. 11 shows a color separation filter, and FIG. 12 shows a diagram showing spectral characteristics of each of the filter elements of the color separation filter. Note that, in the third embodiment, an external view of the still video camera and the structure of the electro-developing recording medium are the same as those of the first and second embodiments, and a block diagram of the still video camera is the same as that of the second embodiment.

In the third embodiment, a light source 42, which is provided in a scanning mechanism 50, has an LED radiating blue light. Other constructions of the third embodiment are basically the same as those of the second embodiment, except for the color separation filter 80.

In FIG. 11, the color separation filter 80 has three primary color filter elements 80R, 80G and 80B. Namely, the color separation filter 80 is divided into the R filter element 80R, the G filter element 80G and the B filter element 80B, by three lines which pass through the center axis of the filter 80, so that each of the filter elements 80R, 80G and 80B has a fan-shape the center angle of which is 120 degrees.

A mask 95 for cutting light is formed on an outermost periphery of the B filter element 80B. An original point sensor (reference 94 in FIG. 7), which is a photo-interrupter, is disposed at a portion facing the outer periphery of the color separation filter 80.

The B filter element 80B passes blue light, and has spectral characteristics such that substantially all of the light emitted from the light source 42 passes therethrough. Namely, as shown by reference L3 in FIG. 12, spectral characteristics of the B filter element 80B are slightly broader than wavelength distribution L4 of the light radiated from the light source 42. The spectral characteristics of the B filter element 80B may be substantially the same as that of wavelength distribution of the light radiated from the light source 42.

Figure 13:
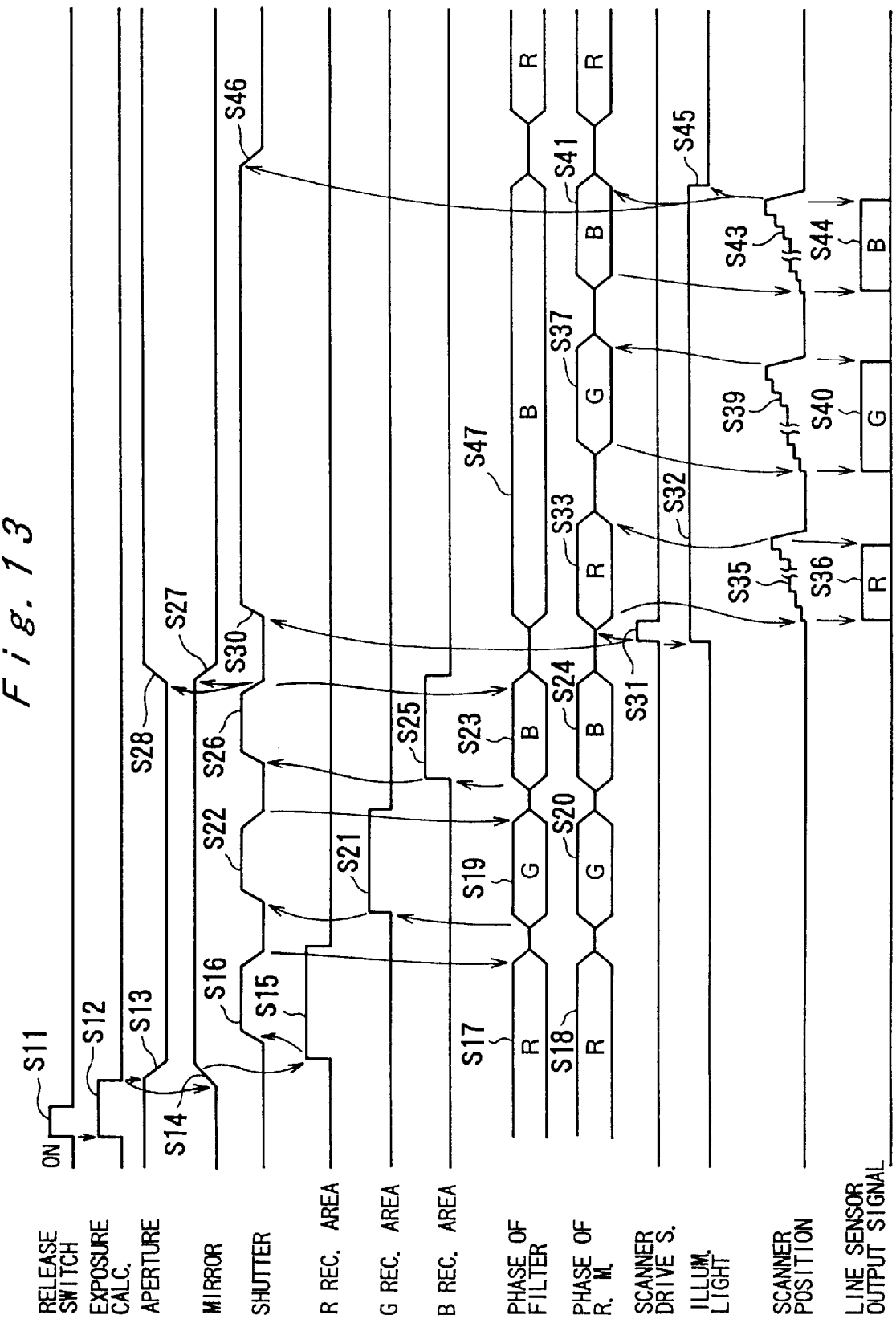
FIG. 13 is a timing chart showing a photographing operation of an image signal of the third embodiment.

FIG. 13 shows a timing chart of a photographing operation and a reading operation of the third embodiment.

The operations from the turning ON of the release switch 14 (reference S11) to the opening operation of the shutter 22 (reference S16) are the same as those of the second embodiment shown in FIG. 10. Therefore, the R image is formed, or developed, on the first recording area 30R.

The rotational positions of the electro-developing recording medium 30 and the color separation filter element 80 are obtained based on original point signals which are outputted from the original point sensors 94 and 94', and the rotation command signals which are outputted from the motor drive circuits 93 and 93', similarly to the second embodiment.

When the shutter 22 is closed, the color separation filter 80 and the electro-developing recording medium 30 are rotated by approximately 120 degrees, respectively. Thus, the G filter element 80G faces the shutter 22 (reference S19), and the second recording area 30G faces the G filter element 80G (reference S20). Then, a recording medium activating signal of the second recording area 30G is set to the ON condition (reference S21), so that an electric voltage is applied to the second recording area 30G, and the shutter 22 is opened for an exposure period (reference S22) which is obtained by the photometry calculation. Therefore, the G image is formed or developed on the second recording area 30G.

When the shutter 22 is closed, the color separation filter 80 and the electro-developing recording medium 30 are rotated by approximately 120 degrees, respectively. Thus, the B filter element 80B faces the shutter 22 (reference S23), and the third recording area 30B faces the B filter element 80B (reference S24). Then, the recording medium activating signal of the third recording area 30B is set to the ON condition (reference S25), so that an electric voltage is applied to the third recording area 30B, and the shutter 22 is opened for the exposure period (reference S26) which is obtained by the photometry calculation. Therefore, the B image is formed or developed on the third recording area 30B.

Thus, when the R, G and B images have been developed by the recording areas 30R, 30G and 30B, the quick return mirror 21 is changed to the down-condition (reference S27) and the aperture 12a is driven to the fully open condition (reference S28).

When the scan start switch 16 is depressed and a scanner drive command signal is outputted (reference S31), the light source 42 is lit (reference S32) and the shutter 22 is fully opened (reference S30). The color separation filter 80 is set in such a manner that the B filter element 80B faces the shutter 22 (reference S47), and the electro-developing recording medium 30 is set in such a manner that the first recording area 3OR faces the B filter element 80B (reference S33). Then, the scanning mechanism 50 is driven, so that a scanning operation of the line sensor 44 is carried out (reference S35). Since substantially all components included in the blue light outputted from the light source 42 pass through the B filter element 80B, the first recording area 30R is effectively illuminated by the light outputted from the light source 42. Therefore, the R image signal recorded on the first recording area 30R is read out through the line sensor and is outputted therethrough (reference S36).

When the output operation of the R image signal is completed, the electro-developing recording medium 30 is rotated by approximately 120 degrees, so that the second recording area 30G faces the B filter element 80B (reference S37). Under this condition, the scanning mechanism 50 is driven so that the scanning operation of the line sensor 44 is carried out (reference S39), and thus, the G image signal is outputted through the line sensor 44 (reference S40).

When the output operation of the G image signal is completed, the electro-developing recording medium 30 is rotated by approximately 120 degrees, so that the third recording area 30B faces the B filter element 80B (reference S41). Then, the scanning mechanism 50 is driven so that the scanning operation of the line sensor 44 is carried out (reference S43), and thus, the B image signal is outputted through the line sensor 44 (reference S44).

Thus, when the R, G and B image signals have been read out from the electro-developing recording medium 30, the light source 42 is put out (reference S45) and the shutter 22 is closed (reference S46).

As described above, in the third embodiment, the LED radiating blue light is provided as the light source 42. And, when an image developed on the electro-developing recording medium 30 is read out therefrom, the B filter element 80B, through which substantially all of the light outputted from the light source 42 passes, is disposed in front of the electro-developing recording medium 30. Therefore, the R, G and B images recorded in the electro-developing recording medium 30 can be read out therefrom. Thus, an effect which is the same as that of the second embodiment is obtained.

Note that, the filter element, which passes light radiated from the light source 42 in the image reading operation, is not restricted to the B filter element 80B, but any filter element can be used if it has spectral characteristics close to a wavelength distribution of the light outputted from the light source 42.

Note that, although the electro-developing recording medium 30 and the color separation filter 80 are constructed in the above described embodiments to rotate about the axes thereof, they can be constructed so as to move along straight lines, respectively.

Further, note that the electro-developing recording medium 30 is not restricted to the structure described above, and may be any other structure by which an image is electronically developed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-162922 (filed on Jun. 6, 1995), No. 7-162923 (filed on Jun. 6, 1995) and No. 7-182094 (filed on Jun. 26, 1995) which are expressly incorporated herein, by reference, in their entirety.

We claim:

1. An electro-developing camera, said camera comprising:

a photographing optical system having an optical axis;

an electro-developing recording medium having a recording area for electronically developing an image formed thereon, said electro-developing recording medium comprising a disk with a plurality of recording areas arranged on said disk, said disk having a center axis, and being rotatable about said center axis;

a disk-shaped color filter having a plurality of color filter elements, a number of said plurality of color filter elements corresponding to a number of said plurality of recording areas of said disk, each color filter element facing a respective recording area of said disk, said disk-shaped color filter having an axis and being rotatable about said axis, said disk-shaped color filter being positioned parallel to and extending coaxially with said disk of said electro-developing recording medium, said disk-shaped color filter being rotatable about said axis in synchronism with rotation of said electro-developing recording medium about said center axis;

a scanning system that scans said electro-developing recording medium and reads out said image formed on said electro-developing recording medium; and a moving system that moves said disk-shaped color filter and said electro-developing recording medium, wherein, when said image is developed, said electro-developing recording medium is positioned at a first position, and when said image developed on said electro-developing recording medium is read out by said scanning system, said electro-developing recording medium is positioned at a second position which is different from said first position, said first position corresponding to the optical axis of said photographing optical system, said second position being offset from the optical axis of said photographing optical system.

2. An electro-developing type camera according to claim 1, wherein said first and second positions are symmetrical about said center axis.

3. An electro-developing type camera according to claim 1, wherein said electro-developing recording medium has a first recording area on which a red image is formed, a second recording area on which a green image is formed, and a third recording area on which a blue image is formed.

4. The electro-developing type camera according to claim 3, said plurality of color filter elements comprising red, green and blue color filter elements, said color filter recording medium.

5. An electro-developing type camera according to claim 4, wherein said scanning system is movable between said electro-developing recording medium and said color filter.

6. An electro-developing type camera according to claim 1, wherein said electro-developing recording medium comprises an electrostatic information recording medium generating an electric charge in accordance with an image formed thereon, and an electric charge keeping medium which generates a visible image in accordance with said electric charge and which can keep said visible image.

7. An electro-developing type camera according to claim 6, wherein said electric charge keeping medium is a liquid crystal display having a memory-type liquid crystal.

8. The electro-developing type camera according to claim 1, further comprising a shutter mechanism positioned between said electro-developing recording medium and said color filter, said shutter mechanism being positioned along the optical axis of said photographing optical system.

9. The electro-developing type camera according to claim 4, a predetermined color component of a color image being recorded in each of said recording areas, said electro-developing recording medium rotating by one revolution when one color image is recorded in said electro-developing recording medium.

10. The electro-developing type camera according to claim 1, said color filter being connected to a motor to be rotated by said motor.

11. The electro-developing type camera according to claim 1, said scanning system comprising a light source, a line sensor located at a position corresponding to said light source, and a moving mechanism that moves said light source and said line sensor together, one of said light source and said line sensor being positioned in a space between said electro-developing recording medium and said color filter, another of said light source and said line sensor being positioned outside of said space and facing said electro-developing recording medium.

12. The electro-developing type camera according to claim 1, said moving system positioned between said electro-developing recording medium and said color filter.

13. An electro-developing type camera, said camera comprising:

a photographing optical system having an optical axis;

an electro-developing recording medium having a plurality of recording areas, said plurality of recording areas for electronically developing an image formed on said electro-developing recording medium, said electro-developing recording medium mounted for rotation about a rotational axis;

a color filter, said color filter mounted for rotation about an axis, said electro-developing medium being rotatable about said rotational axis in synchronism with rotation of said color filter;

a scanning system, said scanning system scanning said electro-developing recording medium and reading out said image developed on said electro-developing recording medium; and a moving system, said moving system moving said electro-developing recording medium between first and second positions, said first position comprising a position in which an image is formed on said electro-developing recording medium when said electro-developing recording medium is positioned on the optical axis of said photographing optical system, said second position comprising a position in which an image developed on said electro-developing recording medium is read out by said scanning system when said electro-developing recording medium is operationally aligned with said scanning system, said first and second positions being substantially oppositely positioned about said rotational axis.

14. The electro-developing type camera according to claim 13, said scanning system comprising a light source positioned at one side of said electro-developing recording medium and a sensor positioned at an opposite side of said electro-developing recording medium.

15. The electro-developing type camera according to claim 13, said rotatable color filter having a plurality of color filter elements, a number of said plurality of color filter elements corresponding to a number of said plurality of recording areas of said electro-developing recording medium, each of said plurality of color filter elements being of a different color.

* * * * *